United States Patent [19]

Moore

[11] 4,156,873
[45] May 29, 1979

[54] TRANSPONDER FOR A MOVING VEHICLE TRACKING SYSTEM

[75] Inventor: Wm. Cullen Moore, Tempe, Ariz.

[73] Assignee: Motorola, Inc., Schaumburg, Ill.

[21] Appl. No.: 818,642

[22] Filed: Jul. 25, 1977

[51] Int. Cl.$^2$ .............................................. G01S 9/56
[52] U.S. Cl. .................................. 343/6.8 R; 325/4;
325/305; 343/100 ST
[58] Field of Search ....... 343/6.8 R, 100 CS, 100 ST;
325/4, 305, 367, 370

[56] References Cited

U.S. PATENT DOCUMENTS

| | | | |
|---|---|---|---|
| 3,242,430 | 3/1966 | Ghose | 325/305 |
| 3,432,853 | 3/1966 | Wise | 343/6.8 R |
| 3,566,274 | 2/1971 | DiToro | 325/367 X |
| 3,986,124 | 10/1976 | Mitchell, Jr. | 325/305 |

*Primary Examiner*—T. H. Tubbesing
*Attorney, Agent, or Firm*—Eugene A. Parsons

[57] ABSTRACT

In a Doppler (frequency shift) spacecraft tracking system, a transponder mounted on the spacecraft including, two or more, receivers connected to spaced-apart antennas for receiving an RF tracking signal transmitted from a ground based station regardless of the attitude, or position, of the spacecraft. The intermediate frequency (IF) signals from the receivers are combined to provide a continuous third IF signal at the proper frequency and at a phase dependent upon the signals received, which third signal is utilized to control a transmitter for retransmitting coherent reply carrier frequency signals to the ground based station.

5 Claims, 4 Drawing Figures

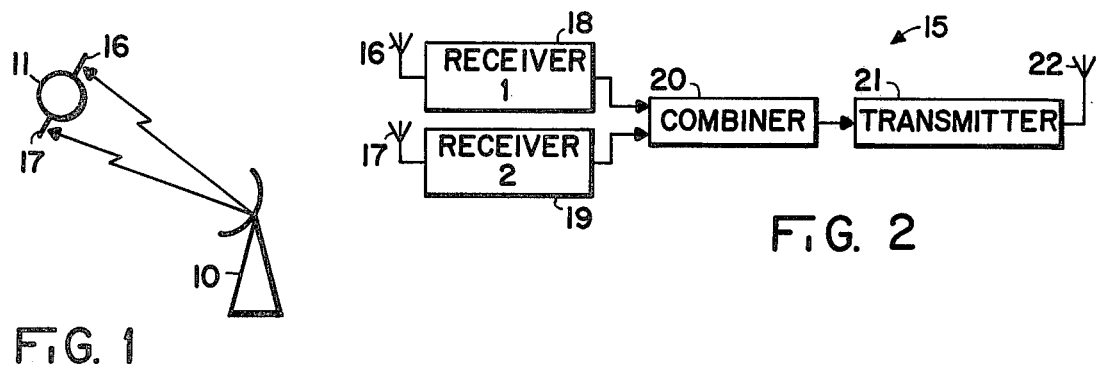
FIG. 1
FIG. 2
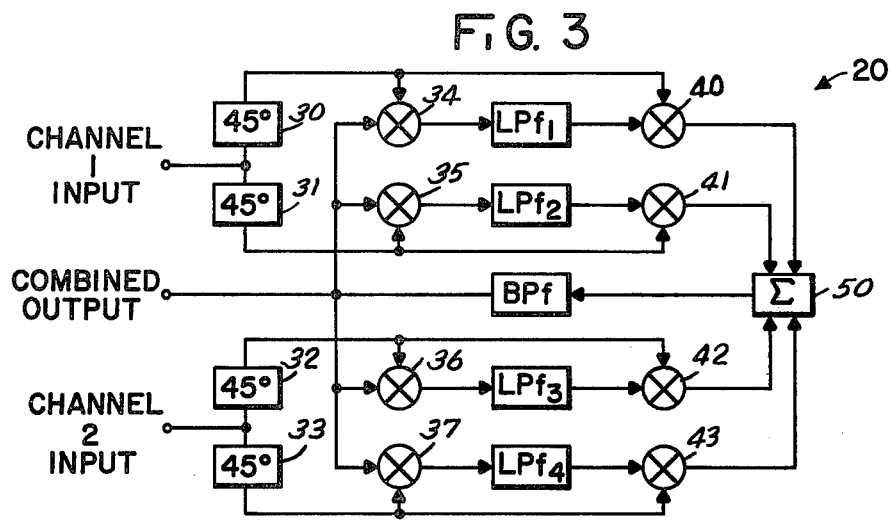
FIG. 3
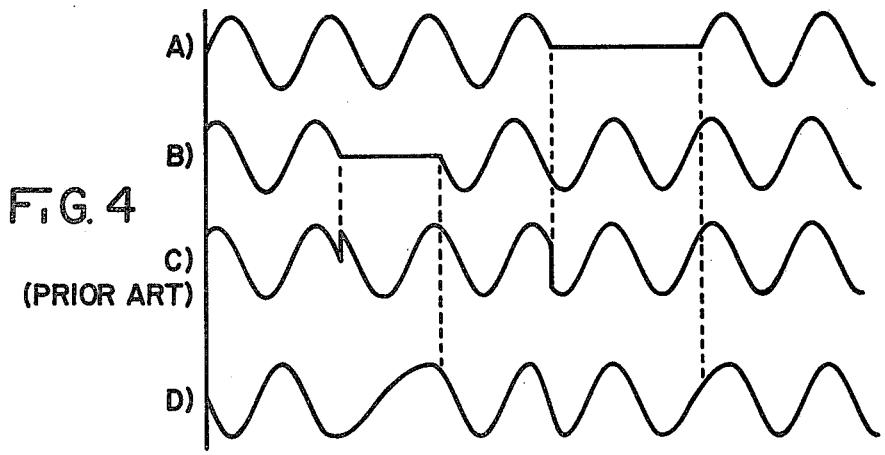
FIG. 4

TRANSPONDER FOR A MOVING VEHICLE TRACKING SYSTEM

BACKGROUND OF THE INVENTION

1. Field of the Invention

In moving vehicle tracking systems, and especially in spacecraft tracking systems, wherein the vehicle changes attitude, or position, relative to the base station, it is often difficult to maintain a direct transmission path to an antenna mounted on the vehicle. To overcome this problem several antennas are normally mounted on the vehicle in spaced-apart positions so that at least one antenna is in communication with the base station at all times and regardless of the attitude or position of the vehicle. However, another problem arises because the antennas are spaced apart. Because the antennas are at different distances from the base station, the phase of the signals received at the antennas differs substantially. Decision-making apparatus typically is required to select which of the several received signal phases will be used to control the frequency and phase of the transmitted signal.

2. Description of the Prior Art

In prior art systems a single receiver is generally used with the plurality of antennas and a switching system is incorporated between the receiver and the antennas so that the antenna receiving the strongest signal is connected to the receiver and the remaining antennas are disconnected. As the vehicle maneuvers the switching systems switches antennas and, because of the switching function and the fact that the antennas are receiving signals of different phases, the composite signal applied to the receiver may contain discontinuities as well as spikes and the like caused by the switching functions. These discontinuities, spikes, etc., cause the system to lose coherence with a resultant loss in transmitted information.

SUMMARY OF THE INVENTION

The present invention pertains to a transponder for use in a moving vehicle tracking system, which transponder includes a plurality of receivers each having a separate antenna affixed to the vehicle in spaced relation from the other antennas with the outputs of the receivers connected to a combining device for producing a continuous control signal having a frequency equal to the output signals of the receivers and a phase which may vary in accordance with an individual signal applied to the combiner or which may differ from the phases of the signals applied thereto when a plurality of signals are applied simultaneously, but the control signal is continuous, rather than having discontinuities at the switching points. The control signal is then used to control a transmitter which retransmits a coherent reply signal to the base station.

It is an object of the present invention to provide a transponder for use in a moving vehicle tracking system wherein a plurality of antennas and receivers are utilized to provide continuous communication with a base station regardless of the vehicle attitude and the transponder combines signals from the receivers continuously without switching transients and the like.

It is a further object of the present invention to provide a redundant phase coherent transponder using simultaneous multiple receive channels in a moving vehicle tracking system with reduced or no loss of coherence.

These and other objects of this invention will become apparent to those skilled in the art upon consideration of the accompanying specification, claims and drawings.

Referring to the drawings, wherein like characters indicate like parts throughout the Figures;

FIG. 1 is a pictorial view of a base station and a spacecraft associated therewith;

FIG. 2 is a block diagram of a transponder, for use in a moving vehicle tracking system, embodying the present invention;

FIG. 3 is a detailed block diagram of a portion of FIG. 1; and

FIG. 4 illustrates a plurality of waveforms wherein waveforms A, B and D illustrate the type of waveforms present in the apparatus of FIG. 2 and waveform C illustrates the type of waveform present in prior art circuitry.

DESCRIPTION OF THE PREFERRED EMBODIMENT

Referring specifically to FIG. 1, a base station 10 is illustrated transmitting a signal to a spacecraft 11. The signal being transmitted to the spacecraft 11 is a tracking signal which may be continuous wave signals. The signal received by the spacecraft 11 is altered in frequency by the doppler effect in accordance with the speed of the spacecraft, and the distance of the spacecraft 11 can also be determined from this characteristic. The equipment can be simplified and the reception improved if a transducer is positioned on the spacecraft 11 which receives the transmitted signals from the base station 10 and retransmits them to the base station 10 at a frequency having a precise mathematical ratio and specified phase relationship to the received frequency.

To perform the function of phase-coherently retransmitting the signal a phase coherent transponder generally designated 15 and illustrated in FIG. 2, is provided. In this embodiment, the transponder 15 frequently has two or more antennas 16 and 17 connected to two or more receivers 18 and 19, respectively, but it should be understood that a transponder may, in many instances, have more than two antennas connected to a like number of receivers. Referring to FIG. 1, the antennas 16 and 17 are affixed to the body of the spacecraft 11 on opposite sides thereof so that communications between the transponder 15 and base station 10 will be possible in spite of maneuvering of the spacecraft 11. Intermediate frequency signals from the phaselock receivers 18 and 19 are applied to two inputs of an rf combiner 20 and a frequency and phase-determining signal is supplied from the combiner 20 to a transmitter 21 which is connected to an antenna 22 for retransmitting signals from the transponder 15 to the base station 10.

Referring to FIG. 1, it can be seen that the path links from the base station to the two antennas 16 and 17 differ for various positions of the spacecraft 11. Therefore, the phases of the signals received at the receivers 18 and 19 will differ. The signals received by the receivers 18 and 19 are at the same frequency but the phases may differ radically. In FIG. 4 A and B typical waveforms for the output signals of receivers 18 and 19, respectively, are illustrated. As the spacecraft 11 maneuvers the antenna 16 or 17 may be shadowed from the base station 10 by the spacecraft 11 causing a null at the output of the receiver 18 or 19, as illustrated by the nulls in the signals of FIG. 4 A and B. When a null in one of the signals is present, to maintain communications with the base station 10 and to prevent loss of information, it is necessary to utilize the information at the other antenna. As illustrated in FIG. 4C, prior art devices simply utilized switching apparatus to switch from receiver 18 to receiver 19 but, because the two signals are at different phases switching from one receiver to the other causes glitches, spikes, and/or switching transients. These discontinuities in the signal cause a loss of information at the base station 10, as described previously.

In the present apparatus, the signals from the receivers 18 and 19 are not switched but are combined in the combiner 20 to produce a third signal at the same frequency and a different phase. This combined signal is illustrated in FIG. 4D. When output signals are present at both receivers 18 and 19 the signal at the output of the combiner 20 is at the same frequency and at a different, or intermediate phase. However, when one or the other of the output signals from the receivers 18 and 19 are absent, the phase of the signal at the output of the combiner 20 gradually changes to the phase of the signal which is present. This slight alteration of phase does not affect the information retransmitted to the base station 10, except to appear as a change in the position of the spacecraft 11 from the base station 10 by a few inches. Since the combined signal, or control signal, from the combiner 20 is a continuous signal without switching transients and the like, no information is lost and the slight alterations in phase of the signal during changes of receivers 18 and 19 will not be noticeable. If the signal transmitted from the base station 10 is in the gigacycles, typical of both NASA and DoD spacecraft tracking systems for example, a few inches of movement of the spacecraft 11 will result in a 360° phase shift in the signal retransmitted to the base station 10 by the transponder 15. Thus, the slight phase shifts (much less than 360°) illustrated in the waveform of FIG. 4D would appear as an insignificant change in the position of the spacecraft 11.

A typical circuit which might be utilized as the combiner 20 is illustrated in FIG. 3. This circuit is an RF-to-RF phase combining circuit which delivers at its output a signal of precisely the input frequency and at a phase representative of the input phases of the several signals. While the RF-to-RF combiner 20 is illustrated in FIG. 3 as a circuit utilizing the low-pass version of the double mixing regenerative combiner technique, it should be understood that other circuits and techniques may be devised by those skilled in the art to provide the required function. As will be recognized by those skilled in the art, the combiner 20 splits each of the output signals from the receivers 18 and 19 into orthogonal components, through the use of 45° phase shifters 30–33, and compares or correlates these components with the output signal in mixers 34–37. The amount of correlation in each of the first mixers 34–37 is utilized to control each of the second mixers 40–43, respectively, or to weight the amount of the component applied through the second mixer to the summing device 50. In this fashion, the components of the two input signals are adjusted until a single output signal at an intermediate phase is produced. If one of the input signals disappears the circuit gradually adjusts to the phase of the single input signal. Thus, the output signal is always at the same frequency as the input signal and is always continuous, i.e. with no discontinuities therein.

While a tracking system with two antennas and two receivers is illustrated, it should be understood that any number of antennas and receivers might be utilized to provide continuous communication between the base station 10 and the spacecraft 11. In general, four receivers may be required with an antenna on each side and end of the spacecraft. Also, it should be understood that the example of a spacecraft and ground based station are utilized herein but other moving vehicle tracking systems might be equally applicable.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. In a moving vehicle tracking system, a transponder mounted on the moving vehicle for receiving tracking signals transmitted thereto from a base station and for retransmitting coherent reply signals to the base station, said transponder comprising:
   (a) a plurality of receivers each having a separate antenna affixed to the vehicle in spaced relation from the other antennas, each receiver providing, upon reception of a tracking signal, an output signal at a predetermined frequency and a phase determined by the path length from the base station to the specific receiver antenna;
   (b) combiner means coupled to each of said receivers for receiving the output signals therefrom and combining the output signals into a single continuous control signal at the predetermined frequency and a phase determined by the output signals applied to said combiner means; and
   (c) a transmitter coupled to said combiner means for receiving said control signal and retransmitting to the base station a reply signal coherent with the received tracking signal.

2. A transponder as claimed in claim 1 wherein the antenna of at least two receivers are positioned so that the output signals are at different phases and the control signal from the combiner means is at a third phase when both output signals are present.

3. A transponder as claimed in claim 1 wherein the vehicle is a spacecraft with antennas mounted generally on opposite sides thereof for maintaining tracking during maneuvers of the spacecraft.

4. In a moving vehicle tracking system having a transponder mounted on the moving vehicle for receiving tracking signals transmitted thereto from a base station and for retransmitting coherent reply signals to the base station, a method of providing coherent reply signals comprising the steps of:
   (a) receiving a transmitted tracking signal with first and second receivers, each receiver providing an output signal at a specific frequency and a phase determined by the path length from the receiver to the base station;
   (b) combining the output signals from the receivers to provide a continuous control signal at the specific frequency and at a phase dependent upon the output signals present; and
   (c) utilizing the continuous control signal to control a transmitter for transmitting coherent reply signals.

5. A method of providing coherent reply signals as set forth in claim 4 wherein the phase of the control signal is different from either of the output signals when both output signals are present and is gradually brought in phase with either of the output signals when the other output signal is absent.

* * * * *